3,309,360
**REACTION PRODUCTS OF STARCH WITH DI-
METHYL SULFOXIDE AND ALCOHOLS**
Luciano Nobile and Tullio La Noce, Milan, Italy, assignors to Miles Italiana Derivati Amidi—M.I.D.A. S.p.A., Naples, Italy
No Drawing. Filed Mar. 4, 1963, Ser. No. 262,334
Claims priority, application Italy, Mar. 23, 1962, 5,716/62
20 Claims. (Cl. 260—233.3)

This invention refers to new acetals. More precisely the invention relates to dialdehyde acetals from polysaccharides and a method for their preparation. For example dialdehyde acetals from polysaccharides, such as corn or potato starch, are products which have only recently been described in chemical literature.

The preparation of dialdehyde starch acetals is described in "Chemistry and Industry" of Jan. 11, 1958, page 40, and consists in treating the dialdehyde starch with a solution of hydrochloric acid in methanol or else in a mixture of methanol and ethanol.

In the first case methylacetal is obtained, in the second a mixture of methylacetal and ethylacetal. These last are, therefore, the only two acetals described until now. They are characterised by insolubility in water and the major part of the usual organic solvents.

On the other hand it is not possible to prepare other acetals containing alkoxy groups differing from methoxy and ethoxy by means of the above procedure. Tests carried out reacting the dialdehyde starch with higher alcohols in the presence of hydrochloric acid have always produced a product which does not contain alkoxy groups. We have thought it important to find a procedure for the preparation of acetals with other types of alcohols, in order to obtain polymers more valuable than those obtained by reaction with methanol or ethanol. It has occurred to us that modifying of the dialdehyde starch molecule would produce resins with better melting properties and solubility in organic solvents. This is desirable above all in view of the possibility of wider industrial application of the products.

A first aim of this invention is the preparation of aldehyde acetals of polyaccharides, and particularly of dialdehyde starch by reaction of one mole of the selected dialdehyde with an excess over one mole and preferably 2–8 moles, of a dialkyl sulfoxide at a temperature of 40–100° C. and reaction of the product thus obtained with an excess over 5 moles and preferably 5–30 moles, of a saturated or unsaturated primary, secondary, or tertiary aliphatic or araliphatic alcohol or a polyalcohol at a temperature between 40–100° C., and preferably between 60–70° C., in the presence of an acid and preferably hydrochloric, sulfuric or p-toluene sulfonic acid, as a catalyst, for a period from 2 to 10 hours. Another aim of this invention is the preparation of new acetals of the polysaccharide dialdehydes having remarkable properties as industrial resins and molding powders, with favourable solubility in organic solvents and a low melting point.

Applications peculiar to these new resins are the preparation of surface coatings and of rapidly evaporating solution for the formation of particularly resistant films. As mentioned above, reaction of dialdehydes with a dialkyl sulfoxide leads to the formation of adducts; the reaction is more or less exothermic and characterised by sudden solidification of the reaction mass which is at first formed of a solid and liquid phase.

The solid mass thus obtained is stable over long periods and has constant physical properties. In the infrared region of the spectrum the adduct shows a decrease or disappearance of the absorption band at 1730 cm.$^{-1}$, characteristic of the carbonyl group, and formation of an intense characteristic band at 950 cm.$^{-1}$ Among the dialkyl sulfoxides, the best results are obtained with sulfoxides of lower alkyls, especially dimethyl and diethyl sulfoxide and mixed sulfoxides. The reaction of the adduct obtained with the selected alcohol occurs, as mentioned above, in the presence of an acid as the catalyst.

While we have observed that hydrochloric acid gives excellent results, other acids can be equally used, provided they do not alter the nature of the adduct or of the reacting substances, for example by oxidation or reduction. Of these, sulfuric acid has been found useful besides p- and n-toluensulfonic acid and others.

Many alcohols can be used for the reaction. For example, the following have proved useful: propanol, isopropanol, normal or branched butanol, normal or branched octanol, allyl alcohol, propargyl alcohol, benzyl alcohol, cinnamic alcohol, propylene glycol, glycerol or other polyols, and many others. When the adduct is mixed with the selected alcohol in the presence of the catalyst, the uniform suspension which at first forms, is generally gradually transformed, by heating, into a gelatinous mass, which becomes fluid as the reaction proceeds. At the end of the reaction, the mass is fluid and translucent and can be made clear on treating with charcoal and/or kieselguhr.

After evaporation of the excess alcohol at the end of the reaction, the residual mass is poured into water or into a solvent in which the final product is insoluble and the precipitated product is collected and dried.

*Example 1.—Allyl acetal of dialdehyde starch*

A mixture of 500 g. of dialdehyde starch from corn starch (degree of oxidation 96%, moisture content 0.67%) and 550 g. of dimethyl sulfoxide is slowly heated, with stirring, to a temperature of 75–80° C. At this temperature the mixture solidifies with a moderate exothermic reaction (100° C.). When cool, the reaction mixture is treated, in the following order, with 1190 g. of allyl alcohol and a quantity of 30% methanolic HCl solution, sufficient to obtain an 1% concentration of HCl in the reaction mass.

The latter is heated to 60–65° C. for 4 hours. After some minutes the mass tends to swell and become gelatinous. On continuing the reaction, the mass tends to liquify becoming yellow-brown in colour. After 3 hours' reaction the mass is completely fluid. After 4 hours' reaction the mass is decolorized with charcoal and is filtered through a layer of Celite. The filtrate is concentrated to a sticky consistency and is poured slowly into 15 litres of water, under vigorous stirring.

The white precipitate is filtered through a cloth, washed many times with water and dried. The product decomposes above 250° C. Bright and clear films are obtained on a metal or glass surface from a solution of the acetal in dioxane after evaporation of the solvent. On keeping the films for some hours at 100° C. they adhere perfectly to glass and are distinguished for their remarkable hardness, brightness and resistance to water and organic solvents. The powder is soluble in allyl alcohol, dioxane, propylene carbonate, benzyl alcohol, 2-ethoxyethanol, chloroform, acetic acid, pyridine, pentoxone (Shell), dimethylformamide, dimethylsulfoxide, etc.; it is less soluble in acetone, propanol, isopropanol, butanol, etc. and insoluble in water, benzene, ethyl acetate, isoamyl acetate, methylene chloride, carbon tetrachloride, etc.

*Example 2.—Ethyl acetal of dialdehyde starch*

Five hundred grams of dialdehyde starch from corn starch (degree of oxidation 96%, moisture content 0.67%) and 550 g. of dimethyl sulfoxide are treated in the same way as in Example 1.

After some minutes the mass solidifies at 40–50° C., and is treated with 968 g. of absolute ethyl alcohol and a methanolic HCl solution as indicated in Example 1. After some minutes the mass swells and is gelatinous. The temperature is raised to 65–70° C. and the mass allowed to react for 5–6 hours. At the end of this time a yellow-orange fluid mass is obtained. The small gelatinous residue is filtered and the filtrate is concentrated to about one third of the initial volume.

The residual solution is poured, drop by drop, into 15 litres of water, under vigorous stirring. The white precipitate is filtered, washed several times in water and then dried. The product softens at 174–186° C. and melts completely between 202–208° C. with yellowing. The product dissolves in acetone and the solution gives clear and bright films.

*Example 3.—Propyl acetal of dialdehyde starch*

50 g. of dialdehyde starch from corn starch and 55 g. of dimethyl sulfoxide are treated according to Example 1.

After cooling to 40–50° C., 200 g. of propanol and the methanolic HCl solution are added to the concentration of about 1% of the acid. After some minutes the mass swells and becomes gelatinous. The temperature is brought to 65–70° C. and the mass stirred while reacting for 5–6 hours. At the end of the reaction the solution is concentrated to a sticky consistency and the residue is poured into 2 litres of $H_2O$. The white precipitate is filtered and washed several times with water and dried.

The product begins to swell at 70° C. and melts completely at 95° C. (without decomposition).

*Example 4.—Butyl acetal of dialdehyde starch*

The process is the same as in the preceding examples, using 50 g. of dialdehyde starch from corn starch, 55 g. of dimethyl sulfoxide, 156 g. of butyl alcohol and methanolic hydrochloric acid solution to a 1% concentration. At the end of the reaction the sticky solution is slowly poured into 2 litres of water. The sticky white precipitate is collected and dissolved in a little acetone. The acetone solution, which can later be decolorized, is poured into 2 litres of water, under stirring. The solid white precipitate is collected on a centrifuge, washed many times in water and dried.

The product begins to soften at 105° C. and melts completely at 130° C. (without decomposition).

*Example 5.—2-ethylhexyl acetal of dialdehyde starch*

The process is the same as in the preceding examples, using 50 g. of dialdehyde starch from corn starch, 55 g. of dimethyl sulfoxide, 273 g. of 2-ethylhexyl alcohol and methanolic HCl. At the end of reaction the sticky fluid is poured into 2 litres of methyl alcohol. The sticky precipitate is collected and consisting of a small quantity of acetone, then poured into 2 litres of water.

The precipitate is collected on a centrifuge as quickly as possible, as it tends to become sticky. The product begins to swell at 70° C. and melts completely at 100° C. (without decomposition).

*Example 6.—Propylene glycol acetal of dialdehyde starch*

The process is the same as for the preceding examples, using 50 g. of dialdehyde starch from corn starch, 55 g. of dimethyl sulfoxide, 160 g. of propylene glycol and methanolic HCl.

At the end of reaction the sticky mass is washed with benzene, then poured into 2 litres of $H_2O$. The precipitate is quickly collected on a centrifuge, as the product slowly dissolves. The product starts to swell at 125° C. and melts completely at 155° C. (with slight decomposition).

*Example 7.—Cinnamyl acetal of dialdehyde starch*

This process is as above, using 50 g. of dialdehyde starch from corn starch, 56 g. of dimethyl sulfoxide and 200 g. of cinnamic alcohol. At the end of the reaction the semi-fluid mass is poured into 1.5 litres of ethanol. The semi-solid precipitate obtained is dissolved in a little acetone and then poured into 2 litres of water under vigorous stirring. The product does not melt but begins to decompose above 200° C. and decomposition continues slowly up to 300° C.

*Example 8.—Benzyl acetal of dialdehyde starch*

The process is the same as above, using 50 g. of dialdehyde starch from corn starch, 55 g. of dimethyl sulfoxide and 226 g. of benzyl alcohol. At the end of the reaction the sticky solution is poured into 500 cc. of isopropanol. The sticky precipitate is collected and dissolved in a little acetone. The solution is slowly poured into 2 litres of water, under vigorous stirring. The white precipitate is collected on a centrifuge, washed several times in water and dried in the oven for several hours. The product does not melt but begins to decompose above 200° C. and decomposes completely between 220–230° C.

*Example 9.—Propargyl acetal of dialdehyde starch*

The process is the same as above, using 50 g. of dialdehyde starch from corn starch, 55 g. of dimethyl sulfoxide and 118 g. of propargyl alcohol.

At the end of the reaction, as the solution is very thick, it is diluted with 50 cc. of dioxane, then slowly poured into 2 litres of water under stirring. The solid precipitate is collected and washed well with water and dried in a vacuum oven. The product does not melt; it begins to decompose above 220° C. and decomposition proceeds slowly until 300° C.

*Example 10.—Isopropyl acetal of dialdehyde starch*

The process is the same as above, using 50 g. of dialdehyde starch from corn starch, 55 g. of dimethyl sulfoxide and 126 g. of isopropyl alcohol. At the end of the reaction the mass is in the form of a sticky solution. It is diluted with 50 cc. of acetone, decolorized with charcoal, and the acetone is evaporated. The residual solution is slowly poured into 2 litres of water, under vigorous stirring. The acetal is quickly precipitated in the form of a white solid which is collected on a centrifuge cloth and washed several times in water. It is dried in a vacuum oven. The product begins to soften at 205° C. and melts clear, but sticky, between 210–220° C. with slight yellowing.

What is claimed is:

1. A process for preparing dialdehyde starch acetals, which comprises reacting one mole of dialdehyde starch of a degree of oxidation of about 96%, with 2 to 8 moles of dimethyl sulfoxide at a temperature of 40–100° C., and reacting the adduct so obtained with 5 to 30 moles of an alcohol selected from the group consisting of lower aliphatic saturated and unsaturated alcohols, aryl-lower alkanols and cinnamyl alcohol, at a temperature of 40–100° C., in the presence of an acid catalyst under anhydrous conditions.

2. Process according to claim 1, wherein the dialdehyde starch is prepared from corn starch.

3. Process according to claim 1, in which the acid used as the catalyst is n- or p-toluenesulfonic acid.

4. Process according to claim 1, in which the acid used as the catalyst is hydrochloric acid.

5. Process according to claim 1, in which the reaction between the adduct of the dialdehyde starch with the dimethyl sulfoxide and the alcohol takes place at 60–70° C.

6. Process according to claim 1, in which the alcohol is allyl alcohol.

7. Process according to claim 1, in which the alcohol is ethanol.

8. Process according to claim 1, in which the alcohol is propanol.

9. Process according to claim 1, in which the alcohol is butanol.

10. Process according to claim 1, in which the alcohol is 2-ethylhexyl alcohol.

11. Process according to claim 1, in which the alcohol is propylene glycol.

12. Process according to claim 1, in which the alcohol is cinnamyl alcohol.

13. Process according to claim 1, in which the alcohol is benzyl alcohol.

14. Process according to claim 1, in which the alcohol is isopropanol.

15. The product of the process of claim 1.

16. The product of the process of claim 1, wherein the alcohol is allyl alcohol.

17. The product of the process according to claim 1, wherein the alcohol is ethanol.

18. The product of the process according to claim 1, wherein the alcohol is propanol.

19. The product of the process according to claim 1, wherein the alcohol is butanol.

20. The adduct obtained by reacting dialdehyde starch of a degree of oxidation, of about 96% with 2–8 moles of dimethyl sulfoxide at a temperature of 40–100° C.

References Cited by the Examiner

UNITED STATES PATENTS

| | | | |
|---|---|---|---|
| 3,037,018 | 5/1962 | Gugliemelli | 260—233.3 |
| 3,132,181 | 5/1964 | Gugliemelli | 260—602 |

LEON J. BERCOVITZ, *Primary Examiner.*

R. W. MULCAHY, *Assistant Examiner.*